United States Patent [19]

Nozaki

[11] Patent Number: 4,716,410
[45] Date of Patent: Dec. 29, 1987

[54] CATV DATA TRANSMISSION METHOD

[75] Inventor: Takashi Nozaki, Tokyo, Japan

[73] Assignee: Pioneer Electronic Corporation, Tokyo, Japan

[21] Appl. No.: 56,351

[22] Filed: May 27, 1987

Related U.S. Application Data

[63] Continuation of Ser. No. 681,748, Dec. 14, 1984, abandoned.

[30] Foreign Application Priority Data

Dec. 16, 1983 [JP] Japan ................................ 58-238360

[51] Int. Cl.⁴ .......................... H04Q 9/14; H04N 7/00
[52] U.S. Cl. ................................ 340/825.520; 358/86
[58] Field of Search ...................... 340/825.52, 825.47; 370/85; 358/86, 8 X; 455/4

[56] References Cited

U.S. PATENT DOCUMENTS

| | | | |
|---|---|---|---|
| 4,455,570 | 6/1984 | Saeki et al. ............................. | 358/86 |
| 4,476,488 | 10/1984 | Merrell ................................... | 358/86 |
| 4,536,791 | 8/1985 | Campbell et al. ...................... | 358/86 |
| 4,600,921 | 7/1986 | Thomas ................................. | 358/84 |

FOREIGN PATENT DOCUMENTS 2118750  11/1983  United Kingdom .................. 370/85

Primary Examiner—Donald J. Yusko
Attorney, Agent, or Firm—Sughrue, Mion, Zinn, Macpeak & Seas

[57] ABSTRACT

A CATV data transmission method in which data is transmitted to terminal units having their own addresses by addressing. Each terminal unit has a memory storing its own address and a plurality of group addresses, each being used for collectively transmitting data to the terminal units in the respective group. When addressed by the data transmission side, the terminal unit performs comparison with its own address and comparison with the group addresses successively. When coincidence is obtained in the comparison, data is received from the terminal unit.

1 Claim, 5 Drawing Figures

CATV DATA TRANSMISSION METHOD

This is a continuation of application Ser. No. 681,748 filed Jan. 14, 1984, now abandoned.

BACKGROUND OF THE INVENTION

The present invention relates to a CATV (cable television) data transmission method in which data transmission is performed for groups of terminal units by addressing them with respective group addresses.

In a conventional CATV communication system, the central facility transmits data through an authorized channel to the terminal units which are provided for each subscriber. Each terminal unit has its own address, and is addressed to receive data through the authorized channel. If the system includes a large number of terminal units, then much time is required to poll all terminal units. This difficulty may be eliminated by assigning the same group address to a group of terminal units which use the same channel. That is, when a channel common to a group of terminal units is used to transmit data, then the group of terminal units can be addressed collectively.

For instance, as shown in FIG. 1, on the central facility side, that is, on the television signal transmitting side, a group address 1 and an individual address 2 are transmitted to a signal transmission control section 10, and then data 3 is transmitted. On the television signal receiving side, the address data transmitted from the central facility is applied to a group addresss comparator 4 where it is compared with the data in an individual addressing group address memory 5 assigned to the terminal unit. This is a comparison with the group address 1. Upon coincidence, an individual address comparator 7 is instructed to perform a comparison with the individual address. In the individual address comparator 7, comparison is made with the address in an individual address memory 8 assigned to the terminal unit. Upon coincidence with the individual address, a data processing operation is carried out in a data processing section 9. When the group address is not coincident with the data in the memory section, it is compared with the data of a group address memory 6 in the comparator 4. Upon coincidence, a data processing operation is carried out in the data processing section 9 so that the terminal unit can receive the television signal.

The above-described system is advantageous in that addressing each terminal unit can be achieved in a relatively short time compared with a polling system using individual addresses only. However, it is still disadvantageous in that viewing permission cannot be granted to a plurality of groups of terminal units. In other words, it is important in order to increase the degree of utilization for the subscriber that, where one terminal unit receives simultaneous transmission of common information, an optional group of terminal units can be selected.

SUMMARY OF THE INVENTION

In view of the foregoing, an object of the invention is to provide a CATV data transmission method in which, in order to transmit the same information, each terminal unit is designed to store a plurality of group addresses so that information can be transmitted collectively, to thereby increase the efficiency of use of the transmission lines. Also, group selectivity is provided for each terminal unit to increase the degree of utilization.

The foregoing object and other objects of the invention have been achieved by the provision of a CATV data transmission method in which data is transmitted to terminal units having their own addresses by addressing them in which, according to the invention, each terminal unit has a memory storing its own address and a plurality of group address memories which store a plurality of group addresses, each being used for collectively transmitting data to the terminal units in the group, and each terminal unit, when addressed by the data transmission side, performs comparison with its own address and comparison with the group addresses successively, and upon coincidence, receives the data from the data transmission side.

The nature, principle and·utility of the invention will become more apparent from the following detailed description when read in conjunction with the accompanying drawings.

DESCRIPION OF THE PREFERRED EMBODIMENTS

A CATV data transmitting system according to this invention will be described with reference to FIG. 2.

Figure 1:
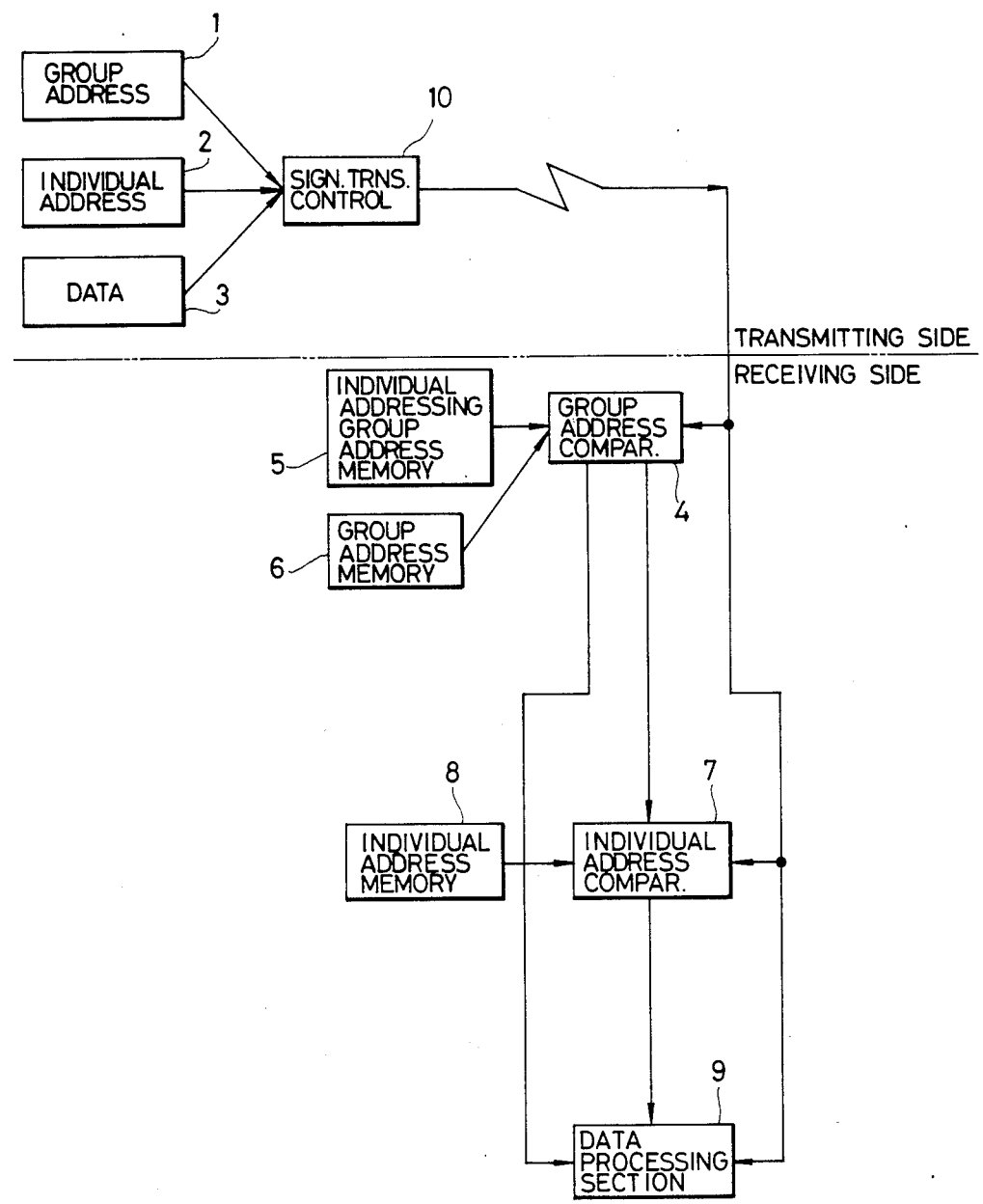
FIG. 1 is a block diagram showing a conventional CATV data transmission system in which each terminal unit has one group address memory.
Figure 2:
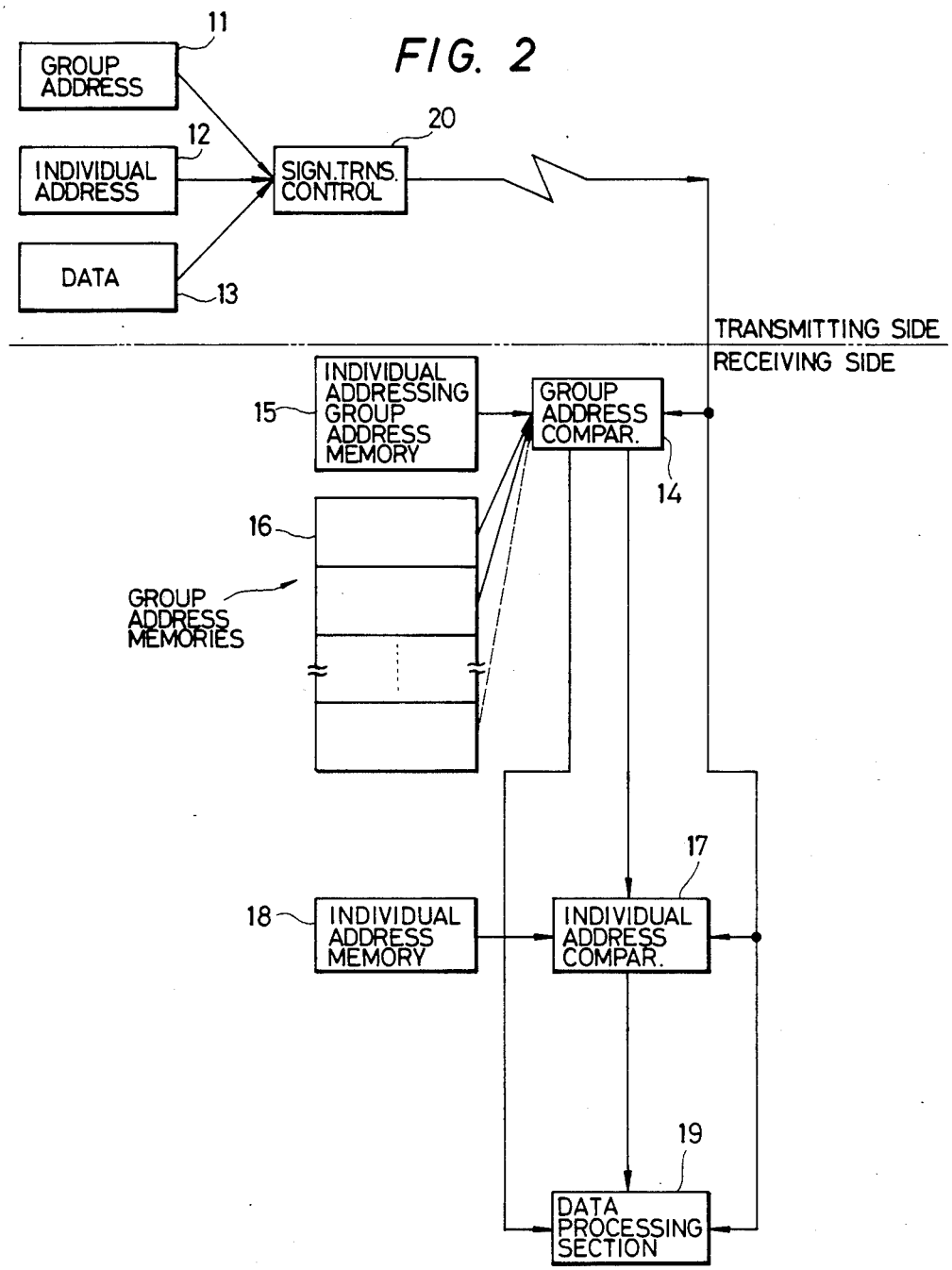
FIG. 2 is a block diagram showing a CATV data transmission system according to the invention in which each terminal unit has a plurality of group address memories.

In FIG. 2, reference numeral 11 designates a group address, and 12, an individual address. These addresses together with data 13 are applied to a signal transmission control section 20 so as to be transmitted. On the signal receiving side, that is, on the terminal unit side, the address data thus transmitted is applied to a group address comparator 14 where it is compared with the data in an individual addressing group addréss memory 15 which is assigned to the terminal unit. This is a comparison with the group address 11. Upon coincidence with the group address, an individual address comparator is instructed to perform a comparison with the individual address; that is, the individual address comparator 17 performs a comparison of the individual address 11 with the individual address in an individual address memory 18 which is assigned to the terminal unit. Upon coincidence with the individual address, a data processing operation is carried out by a data processing section 19. If the group address is not coincident with that in the memory 15, then it is compared with a group address in a group address memory 16. A plurality of memory data items are successively read and subjected to comparison in the above-described manner, and upon coincidence, a data processing operation is similarly carried out by the data processing section 19 so that the terminal unit can receive the television signal.

Figure 3:
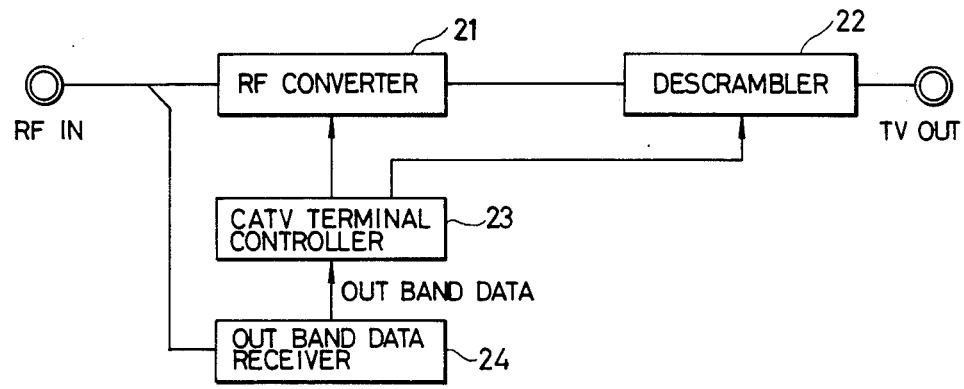
FIG. 3 is a block circuit diagram of a portion of a terminal unit.
Figure 4:
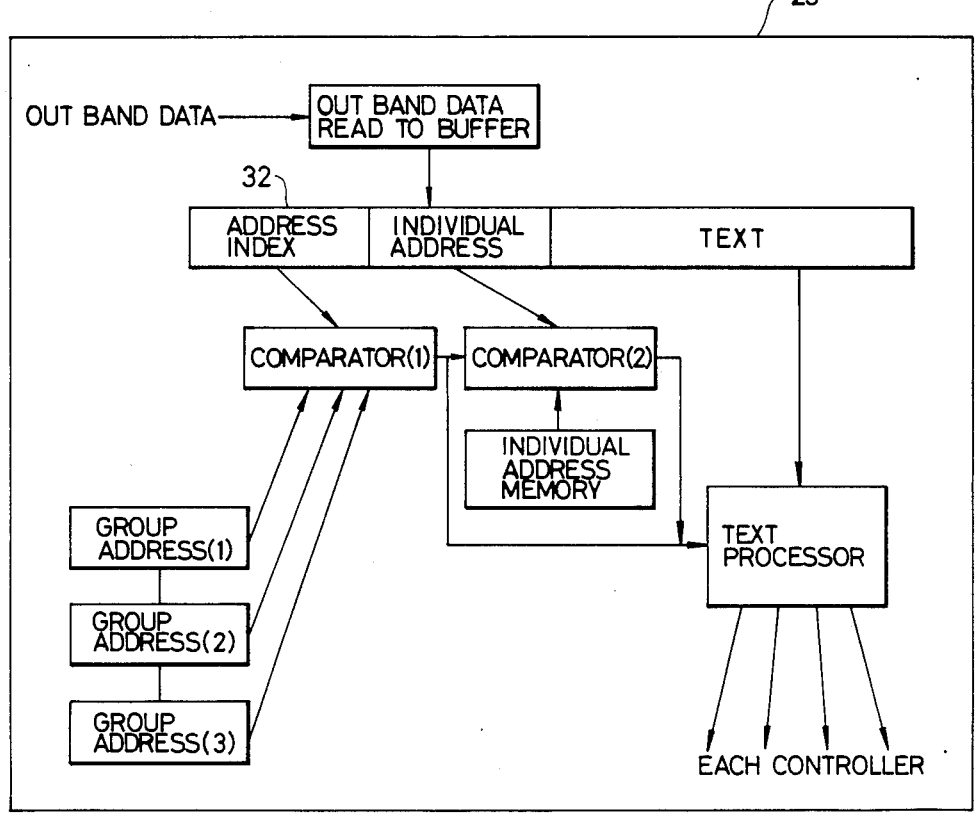
FIG. 4 is a block circuit diagram of a terminal controller used in the terminal unit of FIG. 3.
Figure 5:
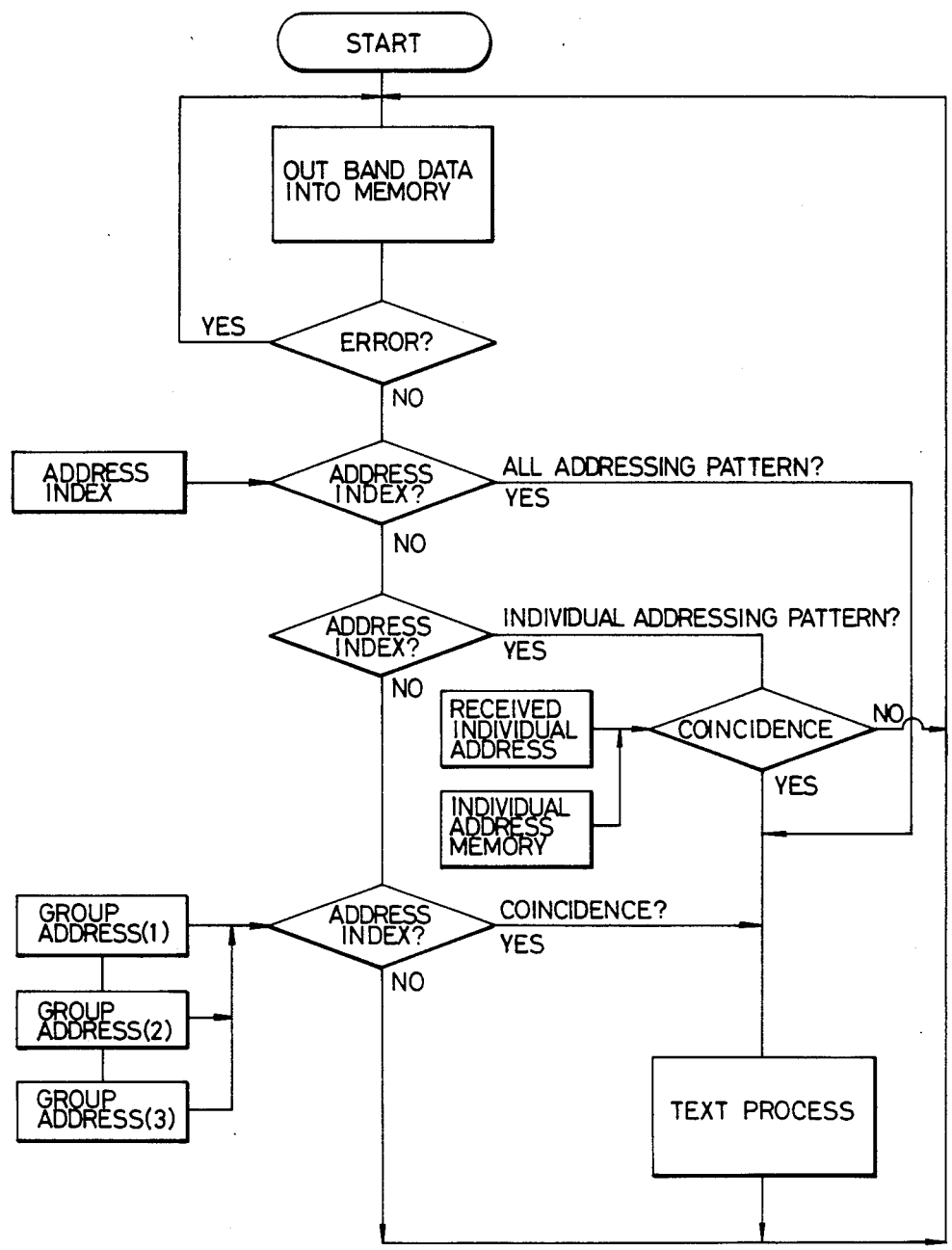
FIG. 5 is a flow chart showing the operations of the terminal controller of FIG. 4.

FIG. 3 shows a block circuit diagram showing a portion of each of the terminal units. The circuit includes an RF converter 21 and a descrambler 22 connected in series 24. The circuit further includes an outband data receiver 24 and a CATV terminal controller 23. A detailed block diagram of the CATV terminal controller of FIG. 3 is shown in FIG. 4 and a flow chart thereof is shown in FIG. 5. The address index 32 indicates an addressing mode in which are included an all-addressing mode, an individual addressing mode and group addressing mode. The all-addressing mode and the individual addressing mode are fixed pattern modes and the group addressing mode indicates the group address. When the received address index is in coincidence with the individual addressing mode, then comparison with the individual address is carried out to thereby determine whether the text is authorized or unauthorized.

The individual address is an address specific to a terminal unit. When the addressing mode is individual, comparison is implemented. The group address is a common number to a plural terminal units.

In the above-described system, even if, in each terminal unit, a group address is accompanied by an individual address every time, the amount of reception-permitted channel data is much larger than before, and therefore the addressing time can be reduced as a whole.

On the subscriber side, television signal reception can be selected with respect to a plurality of groups of terminal units; that is, the degree of utilization of the system is increased.

As is apparent from the above description, according to the invention, a plurality of group addresses can be specified. Therefore, the efficiency of use of the transmission lines is improved, the terminal units can be grouped as desired, and the efficiency of utilization of the CATV system is increased.

I claim:

1. A CATV data transmission method, in which data is transmitted from a transmitting side to a receiving side having a first plurality of individual terminal units, each of said units having assigned an individual address, comprising:

assigning said terminal units to a second plurality of groups, each of said groups containing one or more of the terminal units, that receive collectively data transmitted from said transmitting side and are intended for each terminal in said group;

assigning a unique group address to each of said groups, thereby defining a second plurality of group addresses;

storing at each terminal unit a reference signal and at least two addresses, comprising an individual address and any applicable unique group addresses, said stored applicable unique group addresses comprising all of the unique group addresses for those of said groups to which said terminal unit is assigned;

transmitting from said transmitting side to all terminal units in common at said receiving side, a transmitted signal comprising at least (i) data intended for an individual terminal unit together with an individual address and a group address pattern, comprising at least one of said unique group addresses, or (ii) data intended collectively for one of said second plurality of groups together with a group address pattern, comprising at least one of said unique group addresses;

at each terminal unit, receiving at least said transmitted data and said group address pattern;

in each terminal unit:

initially comparing a portion of said received group address pattern with said reference signal and generating a first signal if said portion and said reference signal are identical and generating a second signal if said portion and said reference signal are not identical;

comparing a stored individual address with said transmitted signal in response to the generation of said first signal;

comparing all of said stored unique group addresses with said transmitted signal in response to the generation of said second signal; and, if coincidence is obtained in either of said address comparisons, processing at said terminal unit said data.

* * * * *